(12) United States Patent
Lee et al.

(10) Patent No.: US 7,418,569 B1
(45) Date of Patent: **\*Aug. 26, 2008**

(54) SYSTEM AND METHOD FOR INBAND MANAGEMENT OF A VIRTUAL DISK

(75) Inventors: Herman Lee, Mountain View, CA (US); Rebecca Beaman, Reading, MA (US); Arthur F. Lent, Cambridge, MA (US)

(73) Assignee: Network Appliance, Inc., Sunnyvale, CA (US)

( * ) Notice: Subject to any disclaimer, the term of this patent is extended or adjusted under 35 U.S.C. 154(b) by 149 days.

This patent is subject to a terminal disclaimer.

(21) Appl. No.: 11/406,989

(22) Filed: Apr. 19, 2006

Related U.S. Application Data

(63) Continuation of application No. 10/324,890, filed on Dec. 20, 2002, now Pat. No. 7,069,307.

(51) Int. Cl.
*G06F 12/00* (2006.01)
(52) U.S. Cl. .................. 711/200; 711/161; 709/219
(58) Field of Classification Search ............. 711/161, 711/200; 709/219
See application file for complete search history.

(56) References Cited

U.S. PATENT DOCUMENTS

| | | |
|---|---|---|
| 5,163,131 A | 11/1992 | Row et al. |
| 5,333,315 A | 7/1994 | Saether et al. |
| 5,355,453 A | 10/1994 | Row et al. |
| 5,485,579 A | 1/1996 | Hitz et al. |
| 5,692,128 A | 11/1997 | Bolles et al. |
| 5,802,366 A | 9/1998 | Row et al. |
| 5,819,292 A | 10/1998 | Hitz et al. |
| 5,931,918 A | 8/1999 | Row et al. |
| 5,941,972 A | 8/1999 | Hoese et al. |
| 5,963,962 A | 10/1999 | Hitz et al. |
| 6,006,275 A | 12/1999 | Picazo et al. |
| 6,031,964 A | 2/2000 | Anderson |
| 6,038,570 A | 3/2000 | Hitz et al. |
| 6,065,037 A | 5/2000 | Hitz et al. |
| 6,363,400 B1 | 3/2002 | Chtchetkine et al. |
| 6,425,035 B2 | 7/2002 | Hoese et al. |
| 6,466,952 B2 | 10/2002 | Hanes et al. |
| 6,493,785 B1 | 12/2002 | Galloway |
| 6,493,811 B1 | 12/2002 | Blades et al. |
| 6,578,118 B1 | 6/2003 | Raza et al. |
| 6,606,690 B2 | 8/2003 | Padovano |
| 6,711,574 B1 | 3/2004 | Todd et al. |

(Continued)

OTHER PUBLICATIONS

U.S. Appl. No. 10/090,963, Chapman.

(Continued)

*Primary Examiner*—Donald Sparks
*Assistant Examiner*—Jared I Rutz
(74) *Attorney, Agent, or Firm*—Cesari and McKenna, LLP

(57) ABSTRACT

The present invention provides a system and method for inband management of a virtual disk. A novel volume information command, which is a vendor-specific SCSI command, is sent by a client to a storage appliance, in response, generates a data structure containing various path and networking data associated with a vdisk. This data structure is then returned to the requesting client via a SCSI connection. A client may then utilize the returned information for generating snapshots or other data integrity/backup features offered by the storage appliance.

8 Claims, 16 Drawing Sheets

U.S. PATENT DOCUMENTS

| | | |
|---|---|---|
| 6,745,207 B2 | 6/2004 | Reuter et al. |
| 6,779,083 B2 | 8/2004 | Ito et al. |
| 6,826,580 B2 | 11/2004 | Harris et al. |
| 6,839,740 B1 | 1/2005 | Kiselev |
| 6,865,617 B2 | 3/2005 | Zeidner et al. |
| 6,880,101 B2 | 4/2005 | Golasky |
| 6,883,083 B1 | 4/2005 | Kemkar |
| 2002/0112022 A1 | 8/2002 | Kazar et al. |
| 2002/0116593 A1 | 8/2002 | Kazar et al. |
| 2003/0076788 A1 | 4/2003 | Grabauskas et al. |
| 2003/0154281 A1 | 8/2003 | Mitsuoka et al. |
| 2003/0177330 A1 | 9/2003 | Idei et al. |
| 2003/0212700 A1 | 11/2003 | Basham |
| 2004/0030668 A1 | 2/2004 | Pawlowski et al. |
| 2004/0030822 A1 | 2/2004 | Rajan et al. |
| 2004/0111485 A1 | 6/2004 | Mimatsu et al. |
| 2004/0117585 A1 | 6/2004 | Glider |
| 2004/0254921 A1 | 12/2004 | Cohen et al. |

OTHER PUBLICATIONS

David Hitz et al. TR3002 File System Design for a NFS File Server Appliance published by Network Appliance, Inc.

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.

Fielding et al. (1999) Request for Comments (RFC) 2616, HTTP/1.1.

NCI TS 332-1999 Fibre Channel Arbitrated Loop (FC-AL-2) published by the American National Standards Institute.

SCSI-3 Primary Commands, published by the American National Standard for Information Systems, Revision 11a, printed Mar. 29, 1997.

DAFS: Direct Access File System Protocol, Version 1.0 published by the DAFS Collaborative.

Maintenance Procedures ND (8C) nd-network disk control Feb. 1985.

Misc. Reference Manual Pages ND (4P) nd-network disk driver Jul. 26, 1985.

Asante EN/SC Adapter Family Installation Guide May 1994.

Asante Desktop EN/SC Adapters User's Manual Apr. 1996.

Performance Without Compromise: The Virtual Storage Architecture 1997.

Anthony J. McGregor Department of Computer Science, University of Waikato Dissertation: Block-Based Distributed File Systems Jul. 1997.

| | |
|---|---|
| PAGE CODE (0x00) | 1005 |
| RESERVED | 1010 |
| LENGTH OF PAGE (MSB) | 1015 |
| LENGTH OF PAGE (LSB) | 1020 |
| APPLIANCE NAME (NULL TERMINATED) | 1025 |

| | |
|---|---|
| PAGE CODE (0x13) | 1605 |
| RESERVED | 1610 |
| LENGTH OF PAGE (MSB) | 1615 |
| LENGTH OF PAGE (LSB) | 1620 |
| SNAPSHOT ID (MSB) | 1625 |
| SNAPSHOT ID | 1630 |
| SNAPSHOT ID | 1635 |
| SNAPSHOT ID (LSB) | 1640 |
| SNAPSHOT NAME (NULL TERMINATED) | 1645 |

SYSTEM AND METHOD FOR INBAND MANAGEMENT OF A VIRTUAL DISK

RELATED APPLICATIONS

This application is a Continuation of U.S. Ser. No. 10/324,890, filed on Dec. 20, 2002 by Herman Lee et al, now issued as U.S. Pat. No. 7,069,307.

FIELD OF THE INVENTION

The present invention relates to storage systems and, in particular, to managing virtual disks in a storage system.

BACKGROUND OF THE INVENTION

A storage system is a computer that provides storage service relating to the organization of information on writable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored.

The file server, or filer, may be further configured to operate according to a client/server model of information delivery to thereby allow many client systems (clients) to access shared resources, such as files, stored on the filer. Sharing of files is a hallmark of a NAS system, which is enabled because of its semantic level of access to files and file systems. Storage of information on a NAS system is typically deployed over a computer network comprising a geographically distributed collection of interconnected communication links, such as Ethernet, that allow clients to remotely access the information (files) on the filer. The clients typically communicate with the filer by exchanging discrete frames or packets of data according to pre-defined protocols, such as the Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the Internet. NAS systems generally utilize file-based access protocols; therefore, each client may request the services of the filer by issuing file system protocol messages (in the form of packets) to the file system over the network identifying one or more files to be accessed without regard to specific locations, e.g., blocks, in which the data are stored on disk. By supporting a plurality of file system protocols, such as the conventional Common Internet File System (CIFS), the Network File System (NFS) and the Direct Access File System (DAFS) protocols, the utility of the filer may be enhanced for networking clients.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC or TCP/IP/Ethernet.

A SAN arrangement or deployment allows decoupling of storage from the storage system, such as an application server, and some level of information storage sharing at the application server level. There are, however, environments wherein a SAN is dedicated to a single server. In some SAN deployments, the information is organized in the form of databases, while in others a file-based organization is employed. Where the information is organized as files, the client requesting the information maintains file mappings and manages file semantics, while its requests (and server responses) address the information in terms of block addressing on disk using, e.g., a logical unit number (lun).

Some SAN arrangements utilize storage appliances that implement virtual disks (vdisks), which are encapsulated data containers stored within a file system. An example of such a storage appliance is described in U.S. patent application Ser. No. 10/215,917, entitled MULTI-PROTOCOL STORAGE APPLIANCE THAT PROVIDES INTEGRATED SUPPORT FOR FILE AND BLOCK ACCESS PROTOCOLS, by Brian Pawlowski, et al., the contents of which are hereby incorporated by reference. Similarly, vdisks are described in U.S. patent application Ser. No. 10/216,453, entitled STORAGE VIRTUALIZATION BY LAYERING VIRTUAL DISK OBJECTS ON A FILE SYSTEM, by Vijayan Rajan, et al., the contents of which are hereby incorporated by reference.

In implementations using vdisks, an underlying file system storing the vdisks often has additional data integrity and/or backup features. For example, the Write Anywhere File Layout (WAFL) file system available from Network Appliance, Inc., of Sunnyvale, Calif., permits snapshots to be generated of a file system containing a vdisk. Snapshots are further described in TR3002 *File System Design for an NFS File Server Appliance*, by David Hitz et al., published by Network Appliance, Inc. and in U.S. Pat. No. 5,819,292 entitled METHOD FOR MAINTAINING CONSISTENT STATES OF A FILE SYSTEM AND FOR CREATING AN USER-ACCESSABLE READ-ONLY COPIES OF A FILE SYSTEM, by David Hitz et al., which are hereby incorporated by reference.

"Snapshot" is a trademark of Network Appliance, Inc. It is used for purposes of this patent to designate a persistent consistency point (CP) image. A persistent consistency point image (PCPI) is a point-in-time representation of the storage system, and more particularly, of the active file system, stored on a storage device (e.g., on disk) or another persistent memory and having a name or other identifier that distinguishes it from other PCPIs taken at other points-in-time. A PCPI can also include other information (metadata) about the active file system at the particular point-in-time for which the image is taken. The terms "PCPI" and "snapshot" shall be used interchangeably throughout this patent without abrogation of Network Appliance's trademark rights.

Specifically, a snapshot is a restorable version of the file system created at a pre-determined point-in-time. Snapshots are generally created on some user-defined regular schedule. The snapshot is stored on-disk along with the active file system, and is called into a buffer cache of the storage appliance as requested by a storage operating system. In known embodiments of file systems containing snapshots, clients may utilize a remote procedure call (RPC) to instruct the file system to generate a snapshot of a given volume or file. To generate a snapshot via RPC, the client must be able to identify the storage appliance, its network address, the volume and the file (or vdisk) that is to be snapshotted. When using NAS-based protocols, the client can easily generate the required information from the use of file handles and other NAS-specific data structures. However, a noted disadvantage of a client of a multi-protocol storage appliance that utilizes SAN networking protocols, such as SCSI, is that the vdisk appears as a lun to the client. Thus, the client cannot identify the multi-protocol storage appliance and/or the volume containing a given vdisk. The client may desire such information in order to utilize the storage appliance's data integrity or backup functionality with regards to the active file system, for example by generating a snapshot of the file system storing the vdisk.

Therefore, it is an object of the present invention to provide a system and method for a client to identify the location and storage appliance associated with a vdisk.

SUMMARY OF THE INVENTION

The disadvantages of the prior art are overcome by providing a system and method for inband management of virtual disks (vdisks) stored on a storage system, such as a multi-protocol storage appliance. Specifically, an inband volume information SCSI command is disclosed. The inband volume information command, when sent to a storage appliance by a client, causes the storage appliance to return, via the SCSI protocol, volume and file information of a given vdisk. The inband volume information command is, in an exemplary embodiment, embodied as a vendor-specific Small Computer Systems Interface (SCSI) command data block. The storage appliance and, in particular, SCSI target code executing within a storage operating system on the storage appliance, responds to the receipt of the inband volume information command by returning a data structure. This data structure comprises header information and a set of data pages, each page identifying an attribute of the vdisk.

A client utilizing a vdisk in a storage system may, by the use of the novel inband volume information command, obtain the requisite information for generating a remote procedure call (RPC) requesting generation of a snapshot by the storage appliance. Thus, a client may utilize the added data integrity and backup features of the storage appliance's implementation of a file system. In alternate embodiments, the returned information may be utilized by other storage management applications that work to manage the host integration of a storage appliance.

BRIEF DESCRIPTION OF THE DRAWINGS

The above and further advantages of the invention may be better understood by referring to the following description in conjunction with the accompanying drawings in which like reference numerals indicate identically or functionally similar elements of which:

FIG. 10 is a schematic block diagram of an exemplary storage appliance name page in accordance with an embodiment of the invention;

FIG. 16 is a schematic block diagram of an exemplary snapshot name page in accordance with an embodiment of the invention.

DETAILED DESCRIPTION OF AN ILLUSTRATIVE EMBODIMENT

A. Multi-Protocol Storage Appliance Environment

Figure 1:
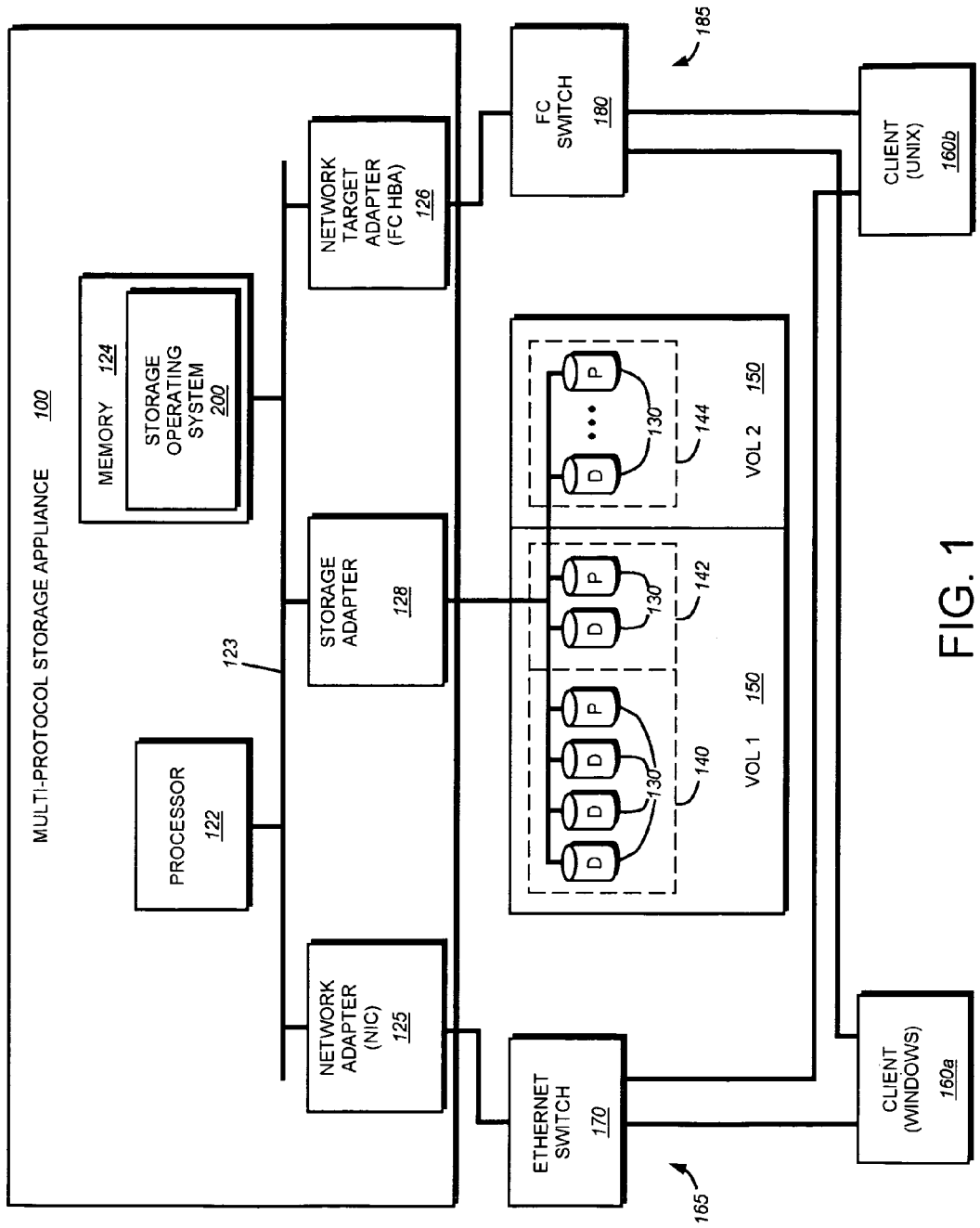
FIG. 1 is a schematic block diagram of an exemplary multi-protocol storage appliance and network environment in accordance with an embodiment of the invention.

FIG. 1 is a schematic block diagram of a multi-protocol storage system 100 configured to provide storage service relating to the organization of information on storage devices, such as disks 130. The storage system 100 is illustratively embodied as a storage appliance comprising a processor 122, a memory 124, a plurality of network adapters 125, 126 and a storage adapter 128 interconnected by a system bus 123. The multi-protocol storage appliance 100 also includes a storage operating system 200 that provides a virtualization system (and, in particular, a file system) to logically organize the information as a hierarchical structure of named directory, file and virtual disk (vdisk) storage objects on the disks 130.

Whereas clients of a NAS-based network environment have a storage viewpoint of files, the clients of a SAN-based network environment have a storage viewpoint of blocks or disks. To that end, the multi-protocol storage appliance 100 presents (exports) disks to SAN clients through the creation of logical unit numbers (luns) or vdisk objects. A vdisk object (hereinafter "vdisk") is a special file type that is implemented by the virtualization system and translated into an emulated disk as viewed by the SAN clients. The multi-protocol storage appliance thereafter makes these emulated disks accessible to the SAN clients through controlled exports, as described further herein.

In the illustrative embodiment, the memory 124 comprises storage locations that are addressable by the processor and adapters for storing software program code and data structures. The processor and adapters may, in turn, comprise processing elements and/or logic circuitry configured to execute the software code and manipulate the various data structures. The storage operating system 200, portions of which are typically resident in memory and executed by the processing elements, functionally organizes the storage appliance by, inter alia, invoking storage operations in support of the storage service implemented by the appliance. It will be apparent to those skilled in the art that other processing and memory implementations, including various computer readable media, may be used for storing and executing program instructions pertaining to the inventive system and method described herein.

The network adapter 125 couples the storage appliance to a plurality of clients 160*a,b* over point-to-point links, wide area networks, virtual private networks implemented over a public network (Internet) or a shared local area network, hereinafter referred to as an illustrative Ethernet network 165. Therefore, the network adapter 125 may comprise a network interface card (NIC) having the mechanical, electrical and signaling circuitry needed to connect the appliance to a network switch, such as a conventional Ethernet switch 170. For this NAS-based network environment, the clients are configured to access information stored on the multi-protocol appliance as files. The clients 160 communicate with the storage appliance over network 165 by exchanging discrete frames or packets of data according to pre-defined protocols, such as the Transmission Control Protocol/Internet Protocol (TCP/IP).

The clients 160 may be general-purpose computers configured to execute applications over a variety of operating systems, including the UNIX® and Microsoft® Windows™ operating systems. Client systems generally utilize file-based access protocols when accessing information (in the form of files and directories) over a NAS-based network. Therefore, each client 160 may request the services of the storage appliance 100 by issuing file access protocol messages (in the form of packets) to the appliance over the network 165. For example, a client 160*a* running the Windows operating system may communicate with the storage appliance 100 using the Common Internet File System (CIFS) protocol. On the other hand, a client 160*b* running the UNIX operating system may communicate with the multi-protocol appliance using either the Network File System (NFS) protocol over TCP/IP or the Direct Access File System (DAFS) protocol over a virtual interface (VI) transport in accordance with a remote DMA (RDMA) protocol over TCP/IP. It will be apparent to those skilled in the art that other clients running other types of operating systems may also communicate with the integrated multi-protocol storage appliance using other file access protocols.

The storage network "target" adapter 126 also couples the multi-protocol storage appliance 100 to clients 160 that may be further configured to access the stored information as blocks or disks. For this SAN-based network environment, the storage appliance is coupled to an illustrative Fibre Channel (FC) network 185. FC is a networking standard describing a suite of protocols and media that is primarily found in SAN deployments. The network target adapter 126 may comprise a FC host bus adapter (HBA) having the mechanical, electrical and signaling circuitry needed to connect the appliance 100 to a SAN network switch, such as a conventional FC switch 180. In addition to providing FC access, the FC HBA may offload fibre channel network processing operations for the storage appliance.

The clients 160 generally utilize block-based access protocols, such as the Small Computer Systems Interface (SCSI) protocol, when accessing information (in the form of blocks, disks or vdisks) over a SAN-based network. SCSI is a peripheral input/output (I/O) interface with a standard, device independent protocol that allows different peripheral devices, such as disks 130, to attach to the storage appliance 100. In SCSI terminology, clients 160 operating in a SAN environment are initiators that initiate requests and commands for data. The multi-protocol storage appliance is thus a target configured to respond to the requests issued by the initiators in accordance with a request/response protocol. The initiators and targets have endpoint addresses that, in accordance with the FC protocol, comprise worldwide names (WWN). A WWN is a unique identifier, e.g., a node name or a port name, consisting of an 8-byte number.

The multi-protocol storage appliance 100 supports various SCSI-based protocols used in SAN deployments, including SCSI encapsulated over TCP (iSCSI) and SCSI encapsulated over FC (FCP). The initiators (hereinafter clients 160) may thus request the services of the target (hereinafter storage appliance 100) by issuing iSCSI and FCP messages over the network 165, 185 to access information stored on the disks. It will be apparent to those skilled in the art that the clients may also request the services of the integrated multi-protocol storage appliance using other block access protocols. By supporting a plurality of block access protocols, the multi-protocol storage appliance provides a unified and coherent access solution to vdisks/luns in a heterogeneous SAN environment.

The storage adapter 128 cooperates with the storage operating system 200 executing on the storage appliance to access information requested by the clients. The information may be stored on the disks 130 or other similar media adapted to store information. The storage adapter includes I/O interface circuitry that couples to the disks over an I/O interconnect arrangement, such as a conventional high-performance, FC serial link topology. The information is retrieved by the storage adapter and, if necessary, processed by the processor 122 (or the adapter 128 itself) prior to being forwarded over the system bus 123 to the network adapters 125, 126, where the information is formatted into packets or messages and returned to the clients.

Storage of information on the appliance 100 is preferably implemented as one or more storage volumes (e.g., VOL1-2 150) that comprise a cluster of physical storage disks 130, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails. It will be apparent to those skilled in the art that other redundancy techniques, such as mirroring, may be used in accordance with the present invention.

Specifically, each volume 150 is constructed from an array of physical disks 130 that are organized as RAID groups 140, 142, and 144. The physical disks of each RAID group include those disks configured to store striped data (D) and those configured to store parity (P) for the data, in accordance with an illustrative RAID 4 level configuration. It should be noted that other RAID level configurations (e.g. RAID 5) are also contemplated for use with the teachings described herein. In the illustrative embodiment, a minimum of one parity disk and one data disk may be employed. However, a typical implementation may include three data and one parity disk per RAID group and at least one RAID group per volume.

B. Storage Operating System

To facilitate access to the disks 130, the storage operating system 200 implements a write-anywhere file system of a novel virtualization system that "virtualizes" the storage space provided by disks 130. The file system logically organizes the information as a hierarchical structure of named directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization system allows the file system to further logically organize information as a hierarchical structure of named vdisks on the disks, thereby providing an integrated NAS and SAN appliance approach to storage by enabling file-based (NAS) access to the named files and directories, while further enabling block-based (SAN) access to the named vdisks on a file system based storage platform. The file system simplifies the complexity of management of the underlying physical storage in SAN deployments.

As noted, a vdisk is a special file type in a volume that derives from a plain (regular) file, but that has associated export controls and operation restrictions that support emulation of a disk. Unlike a file that can be created by a client using, e.g., the NFS or CIFS protocol, a vdisk is created on the multi-protocol storage appliance via, e.g. a user interface (UI) as a special typed file (object). Illustratively, the vdisk is a multi-inode object comprising a special file inode that holds data and at least one associated stream inode that holds attributes, including security information. The special file inode functions as a main container for storing data, such as application data, associated with the emulated disk. The stream inode stores attributes that allow luns and exports to persist over, e.g., reboot operations, while also enabling management of the vdisk as a single disk object in relation to SAN clients. An example of a vdisk and its associated inodes is described in the above-incorporated U.S. patent application Ser. No. 10/216,453 titled STORAGE VIRTUALIZATION BY LAYERING VDISKS ON A FILE SYSTEM.

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system, including a write in-place file system, may be enhanced for use in accordance with the inventive principles described herein. As such, where the term "WAFL" is employed, it should be taken broadly to refer to any storage operating system that is otherwise adaptable to the teachings of this invention.

As used herein, the term "storage operating system" generally refers to the computer-executable code operable on a computer that manages data access and may, in the case of a multi-protocol storage appliance, implement data access semantics, such as the Data ONTAP storage operating system, which is implemented as a microkernel. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive system and method described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 2:
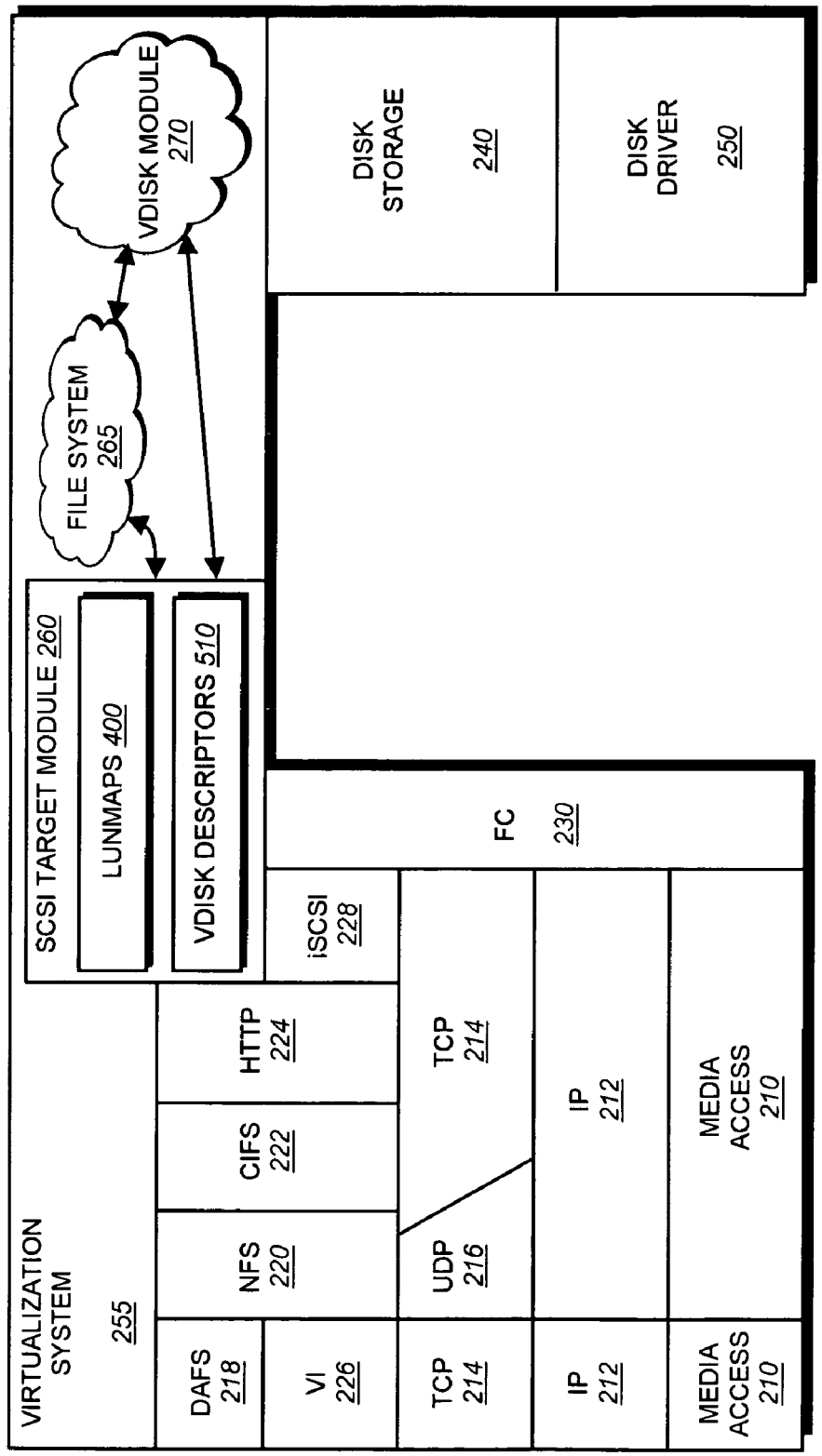
FIG. 2 is a schematic block diagram of an exemplary storage operating system for use on a storage appliance in accordance with an embodiment of the invention.

FIG. 2 is a schematic block diagram of an exemplary storage operating system 200 that may be advantageously used with the present invention. The storage operating system comprises a series of software layers organized to form an integrated network protocol stack or, more generally, a multi-protocol engine that provides data paths for clients to access information stored on the multi-protocol storage appliance using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the DAFS protocol 218, the NFS protocol 220, the CIFS protocol 222 and the Hypertext Transfer Protocol (HTTP) protocol 224. A VI layer 226 implements the VI architecture to provide direct access transport (DAT) capabilities, such as remote direct memory access (RDMA), as required by the DAFS protocol 218.

An iSCSI driver layer 228 provides block protocol access over the TCP/IP network protocol layers, while a FC driver layer 230 operates with the FC HBA 126 to receive and transmit block access requests and responses to and from the integrated storage appliance. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the multi-protocol storage appliance. In addition, the storage operating system includes a disk storage layer 240 that implements a disk storage protocol, such as a RAID protocol, and a disk driver layer 250 that implements a disk access protocol such as, e.g., a SCSI protocol.

Bridging the disk software layers with the integrated network protocol stack layers is a virtualization system 255. The virtualization system 255 is implemented, in the illustrative embodiment, by a file system 265 cooperating with virtualization modules illustratively embodied as, e.g., vdisk module 270 and SCSI target module 260. It should be noted that the vdisk module 270, file system 265 and SCSI target module 260 can be implemented in software, hardware, firmware, or a combination thereof. The vdisk module 270 interacts with the file system 265 to provide a data path from the block-based SCSI target module to blocks managed by the file system. In essence, the vdisk module 270 manages SAN deployments by, among other things, implementing a comprehensive set of vdisk (lun) commands are converted to primitive file system operations ("primitives") that interact with the file system 265 and the SCSI target module 260 to implement the vdisks.

The SCSI target module 260, in turn, initiates emulation of a disk or lun by providing a mapping procedure that translates logical block access to luns specified in access requests into virtual block access to the special vdisk file types and, for responses to the requests, vdisks into luns. The SCSI target module is illustratively disposed between the iSCSI and FC drivers 228, 230 and the file system 265 to thereby provide a translation layer of the virtualization system 255 between the SAN block (lun) space and the file system space, where luns are represented as vdisks. By "disposing" SAN virtualization over the file system 320, the multi-protocol storage appliance reverses the approaches taken by prior systems to thereby provide a single unified storage platform for essentially all storage access protocols.

The SCSI target module 260 also, in the illustrative embodiment, implements the novel inband volume information command, described further below. The SCSI target code responds to SCSI commands issued by clients of the storage appliance. In the illustrative embodiment, the SCSI target code generates the appropriate data structure response to receiving an inband volume information command. This response data structure, described further below, includes the data necessary for a client to generate remote procedure call (RPC) operations to create and manage snapshots of a vdisk.

In addition the SCSI target module 260 includes a set of LUN maps 400 and vdisk descriptors 510. The LUN maps 400, one for each client connected to the storage appliance, provides a mechanism for mapping virtual luns to physical luns, as described further below. The vdisk descriptors 510 are data structures, described further below, containing various data relating to each individual vdisk, specifically data related to the file within the file system on the storage appliance containing the vdisk.

The file system provides capabilities for use in file-based access to information stored on the storage devices, such as disks. In addition, the file system provides volume management capabilities for use in block-based access to the stored information. That is, in addition to providing file system semantics (such as differentiation of storage into discrete objects and naming of those storage objects), the file system 265 provides functions normally associated with a volume manager. As described herein, these functions include (i) aggregation of the disks, (ii) aggregation of storage bandwidth of the disks, and (iii) reliability guarantees, such as mirroring and/or parity (RAID), to thereby present one or more storage objects layered on the file system. A feature of the multi-protocol storage appliance is the simplicity of use associated with these volume management capabilities, particularly when used in SAN deployments.

The file system 265 illustratively implements the WAFL file system having an on-disk format representation that is block-based using, e.g., 4 kilobyte (kB) blocks and using inodes to describe the files. The WAFL file system uses files to store metadata describing the layout of its file system; these metadata files include, among others, an inode file. A file handle, i.e., an identifier that includes an inode number, is used to retrieve an inode from disk. A description of the structure of the file system, including the inode file, is provided in U.S. Pat. No. 5,819,292, titled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued Oct. 6, 1998, which patent is hereby incorporated by reference as though fully set forth herein.

Broadly stated, all inodes of the file system are organized into the inode file. A file system (FS) info block specifies the layout of information in the file system and includes an inode of a file that includes all other inodes of the file system. Each volume has an FS info block that is preferably stored at a fixed location within, e.g., a RAID group of the file system. The inode of the root FS info block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file or vdisk.

As noted, the virtualization system 255 aggregates bandwidth of the disks 130 without requiring user knowledge of the physical construction of those disks. The file system 265 is configured to write (store) data on the disks as long, continuous stripes across those disks in accordance with input/output (I/O) storage operations that aggregate the bandwidth of all the disks of a volume for stored data. When information is stored or retrieved from the vdisks, the I/O operations are not directed to disks specified by a user. Rather, those operations are transparent to the user because the file system "stripes" that data across all the disks of the volume in a reliable manner according to its write anywhere layout policy. As a result of virtualization of block storage, I/O bandwidth to a vdisk can be the maximum bandwidth of the underlying physical disks of the file system, regardless of the size of the vdisk (unlike typical physical implementations of luns in conventional block access products.)

Moreover, the virtualization system leverages file system placement, management and block allocation policies to make the vdisks function correctly within the multi-protocol storage appliance. The vdisk block placement policies are a function of the underlying virtualizing file system and there are no permanent physical bindings of file system blocks to SCSI logical block addresses in the face of modifications. The vdisks may be transparently reorganized to perhaps alter data access pattern behavior.

Figure 3:
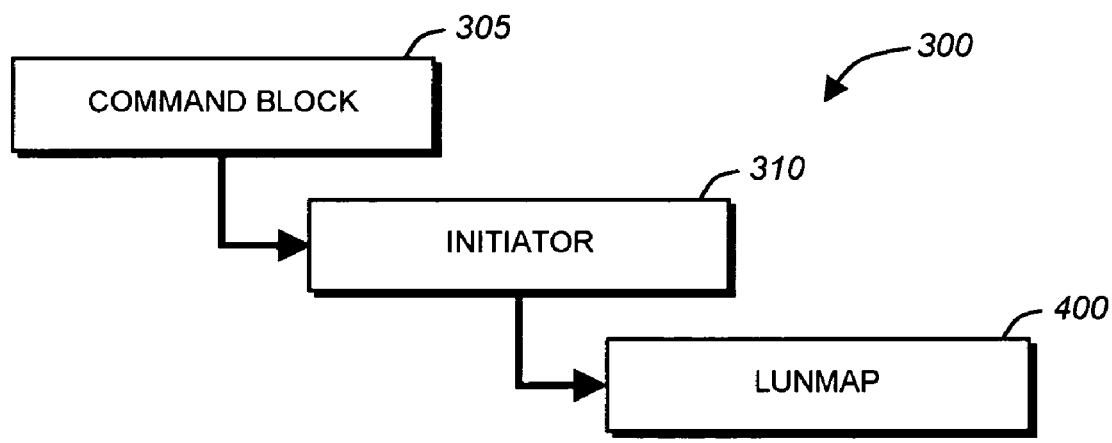
FIG. 3 is a schematic flow chart detailing the path that a command follows within a storage appliance in accordance with an embodiment of the invention.

An exemplary flow structure for processing SCSI or block-based protocol requests is shown in FIG. 3. This flow structure 300 shows that initially, a command block 305 is received by the storage operating system. This command block 305, which in the example of a SCSI-based system is a command Data Block, described further below, will be matched with an initiator data structure 310. The initiator data structure 310 is associated with each client (or SCSI initiator) of the storage appliance. The initiator data structure 310 contains initiator-specific data for use by the storage appliance and serving data access requests. The initiator data structure also contains various data associated with the initiator, including a pointer to a lun map 400.

Figure 4:
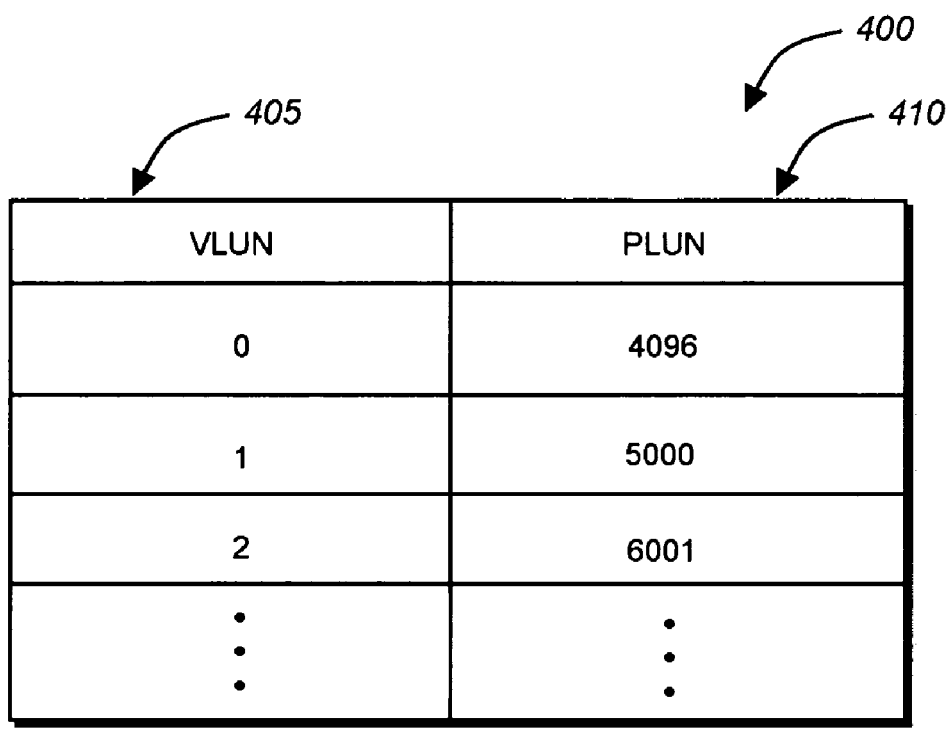
FIG. 4 is an exemplary LUN map in accordance with an embodiment of the pre-sent invention.

An exemplary lun map 400, shown in FIG. 4, maps virtual luns (VLUN) to physical luns (PLUNs). A VLUN is a lun returned to a given SCSI initiator in a storage environment. An initiator may be assigned a set of vluns starting from zero and progressing up to the number of luns that the initiator is connected thereto. Conversely, a PLUN is an actual lun associated with a vdisk managed by the storage appliance. As the storage appliance is an intermediary between clients and vdisks, it must manage a larger set of luns. The lun map 400 has, in the exemplary embodiment, two columns. The first column, VLUN 405 identifies the virtual logical unit number that a given SCSI initiator is accessing. Each SCSI initiator attached to the storage appliance has its own lun address space. The second column is comprised of physical luns 410 mapped to the virtual luns 405. Thus, in the example shown in FIG. 4, VLUN 0 is mapped to PLUN 4096. Similarly VLUN 1 is mapped to PLUN 5000. The use of this VLUN to PLUN mapping enables each SCSI initiator to address a given device with an initiator-specific lun value. The storage appliance utilizes the LUN map 400 to translate a given VLUN from a SCSI initiator to a physical LUN attached to the storage appliance.

Figure 5:
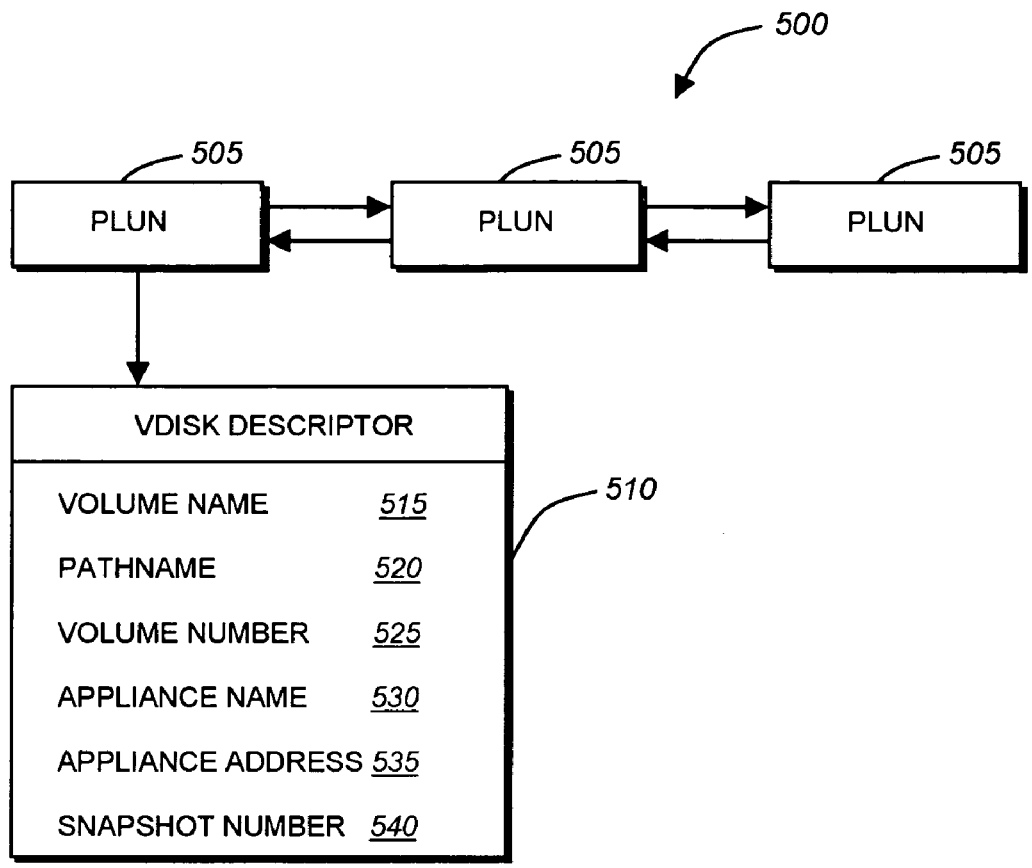
FIG. 5 is a schematic block diagram of an exemplary virtual disk descriptor data block in accordance with an embodiment of the invention.

Once the storage operating system has identified the PLUN that the command is directed towards, the storage operating system identifies the vdisk descriptor 510 associated with that PLUN. FIG. 5 shows an exemplary set 500 of linked PLUN data objects. Each PLUN data descriptor object 505 contains various data (not shown) associated with a given vdisk embodied as that PLUN. This information is used by the storage appliance for management of the given vdisk. Each PLUN data descriptor object 505 points to a vdisk descriptor 510.

Each vdisk managed by a storage appliance has an associated vdisk descriptor 510 includes various data fields for information pertaining to the vdisk. These fields include volume name 515, path name 520, volume number 525, appliance name 530, appliance address 535 and snapshot number 540. It should be noted that the fields described herein are exemplary only in that additional and/or differing fields may be utilized in accordance with various embodiments of the invention. For example, the volume name 515 field identifies the volume containing the vdisk. The path name field 520 describes a path on the volume identified in the volume name 515 field to the file containing the vdisk. Thus if the appliance name stored in field 530 is "Appliance5", the volume name stored in field 515 is "vol0" and the path name stored in field 520 field is "/vdisks/vdisk," then the vdisk identified by this vdisk descriptor 510 may be uniquely identified by the fully qualified path "Appliance5:/vol0/vdisks/vdisk."

C. Inband SCSI Management of vdisks

The SCSI protocol includes certain operation codes that are considered vendor specific. Generally, standard SCSI drivers do not issue commands using these vendor-specific operation codes; however customized SCSI drivers may use these operation codes to retrieve application-specific data. In a typical SCSI driver embodiment, the SCSI driver includes a pass through mechanism that allows ordinary applications to issue SCSI pass through commands that request the driver to issue a command using a vendor-specific command. The use of SCSI vendor-specific operation codes (op codes) is termed "inband" SCSI management as the management commands are being sent via the same network path as data access commands and the use of the requests are termed "inband SCSI requests."

It is often desirous of a client to identify the volume and/or other storage appliance identification information relating to a particular vdisk. This information is useful when, for example, the client desires to cause the storage appliance to generate a snapshot of the volume containing the vdisk. Additionally, this information may be useful to a client when performing management functions on the storage appliance. This determination can be made by, for example, examining the vendor and/or revision fields of a conventional returned Inquiry SCSI command. For example, if the returned Inquiry command identifies the vendor as one that supports snapshots (or other features) that may be remotely generated, then the procedure may decide that the vdisk is capable of supporting snapshots.

Figure 6:
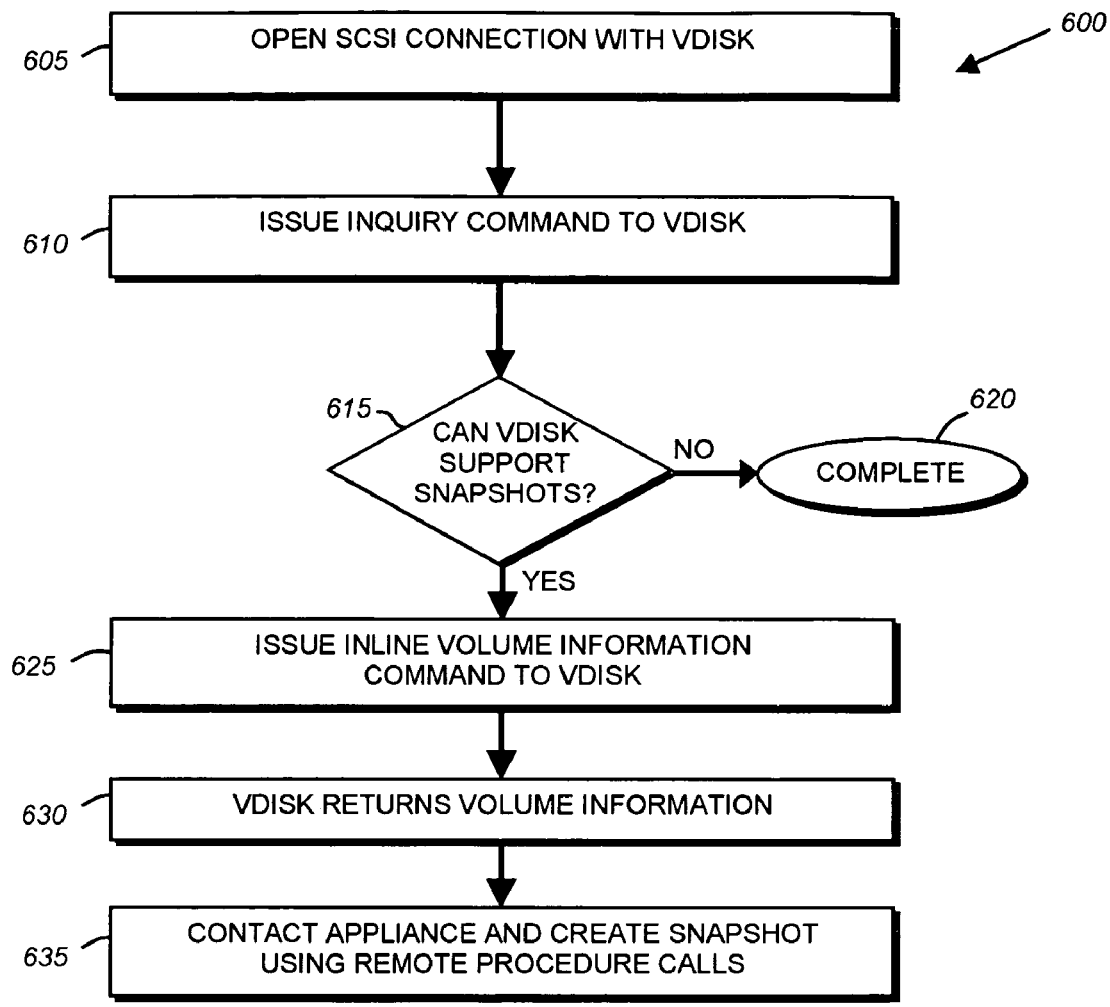
FIG. 6 is a flow chart detailing the steps of a procedure for inband management of a volume containing a vdisk in accordance with an embodiment of the invention.

The steps of an exemplary procedure 600 for inband management of a vdisk is shown in FIG. 6. Initially, in step 605, the client opens a conventional SCSI connection with the vdisk using conventional, SCSI commands. The client then issues, in step 610, a SCSI Inquiry command to the vdisk. The Inquiry command is a standard SCSI command that obtains information pertaining to the disk. The Inquiry command returns such information as the identification of the vendor, the product identification, a revision level for the product and several vendor-specific values. The format of the Inquiry command description block and return data is well-known and described in *SCSI-3 Primary Commands*, dated Mar. 28, 1997 published by the National Committee for Information Technology Standards. From the returned data of the inquiry command, the client can determine if the file system storing the vdisk is capable of supporting snapshots (step 615). It should be noted that other capabilities can be verified and that the use of snapshots is exemplary only.

If the vdisk cannot support snapshots, then the procedure is completed step 620. Otherwise, the client issues novel inband volume information command to the vdisk in step 625. This inband volume information command, described further below, causes the storage appliance serving the vdisk to return volume information (step 630) that identifies various information relating to the storage appliance and volume containing the vdisk. Once the client has the volume information, the client may then contact the storage appliance and create a snapshot of the appropriate volume using RPCs in step 635. An example of a system configured to use RPCs to create snapshots is described in U.S. patent application Ser. No. 10/090,963, entitled SYSTEM AND METHOD FOR CREATING A POINT-IN-TIME RESTORATION OF A DATABASE FILE, by Dennis E. Chapman.

Figure 7:
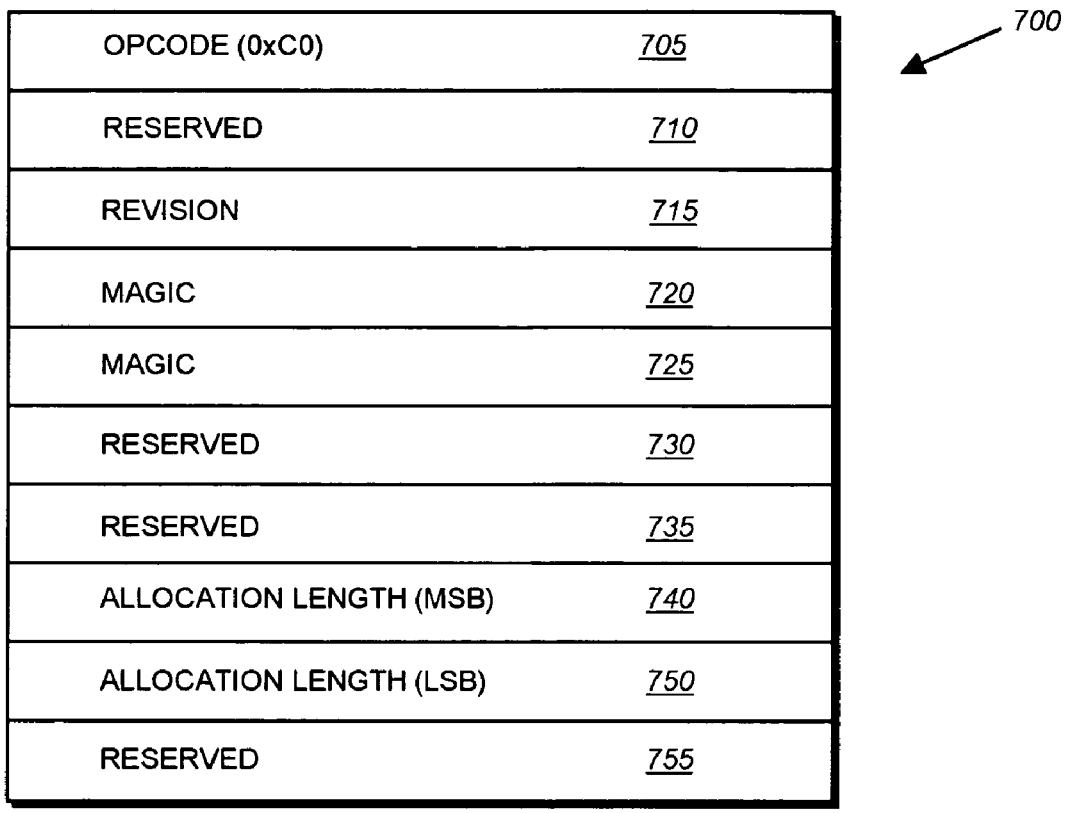
FIG. 7 is a schematic block diagram of an exemplary command data block for inband management of a vdisk in accordance with an embodiment of the invention.

The inband volume information command is, in the illustrative embodiment, implemented as a special SCSI command using a vendor-specific operation code. An exemplary SCSI command descriptor block (CDB) 700 for the inband volume information command is shown in FIG. 7. The CDB 700 contains, in the illustrative embodiment, 10 bytes of information. The first byte identifies the operation code (opcode) 705 identifying this command descriptor block. In the illustrative environment the opcode 705 has a value of 0xC0. The next byte in the CDB 700 is a reserved field 710. The revision field 715 identifies the revision level of the client's SCSI driver. Two "magic" bytes 720 and 725 are used to identify various unique features of the SCSI driver, for example, the vendor generating the SCSI driver. There are also two additional reserved bytes 730 and 735, which are then followed by two allocation length bytes 740 and 750. The allocation length identifies the maximum number of bytes that the initiator has allocated for return data. Finally, an additional reserved byte 755 is utilized. It should be noted that the CDB described herein is exemplary only. As one skilled in the art will appreciate, one or more of the reserved bytes may be replaced with a page code to enable the CDB to contain additional information.

In accordance with an illustrative embodiment of the present invention, storage appliances and, specifically the SCSI target code 260 within storage operating system 200 are programmed to respond to receiving an inband volume information CDB 700. Generally, in accordance with the present invention, any SCSI target may be adapted to respond to the novel inband volume information command. Similarly clients executing vendor-specific SCSI drivers may utilize an inband volume information CDB 700 to request volume information relating to a particular vdisk.

Figure 8:
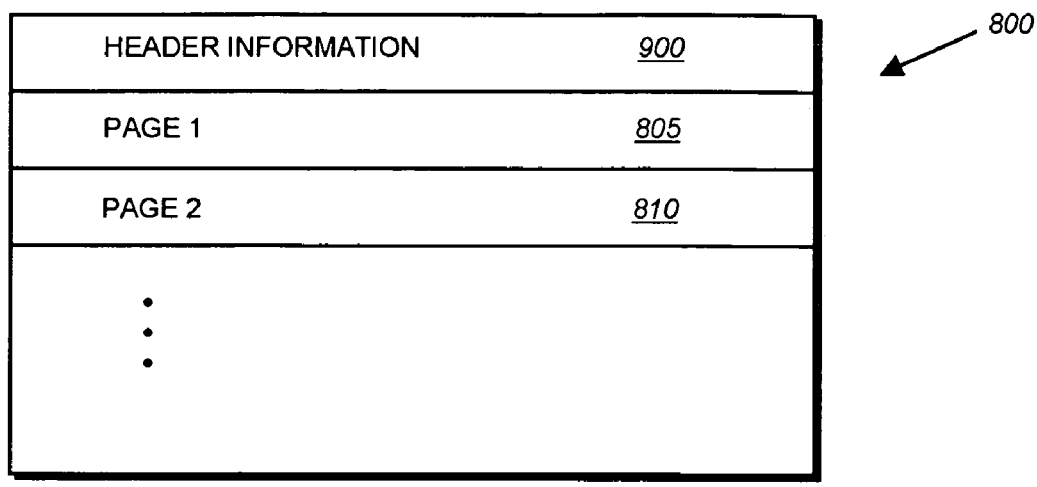
FIG. 8 is a schematic block diagram of an exemplary return data structure in accordance with an embodiment of the invention.

To request volume information, a client transmits an inband volume information CDB 700 to the particular vdisk from which information is desired. In response the storage appliance returns the requested inband volume information. The inband volume information comprises a set of data pages. Each of the data pages has its own unique page code and will be, in the exemplary embodiment, padded to be word aligned. FIG. 8 shows a schematic block diagram of an overall layout 800 of the return volume information. The overall return layout 800 begins with a set of header information 900 and then a sequential listing of pages 805 and 810, described further below.

Figure 9:
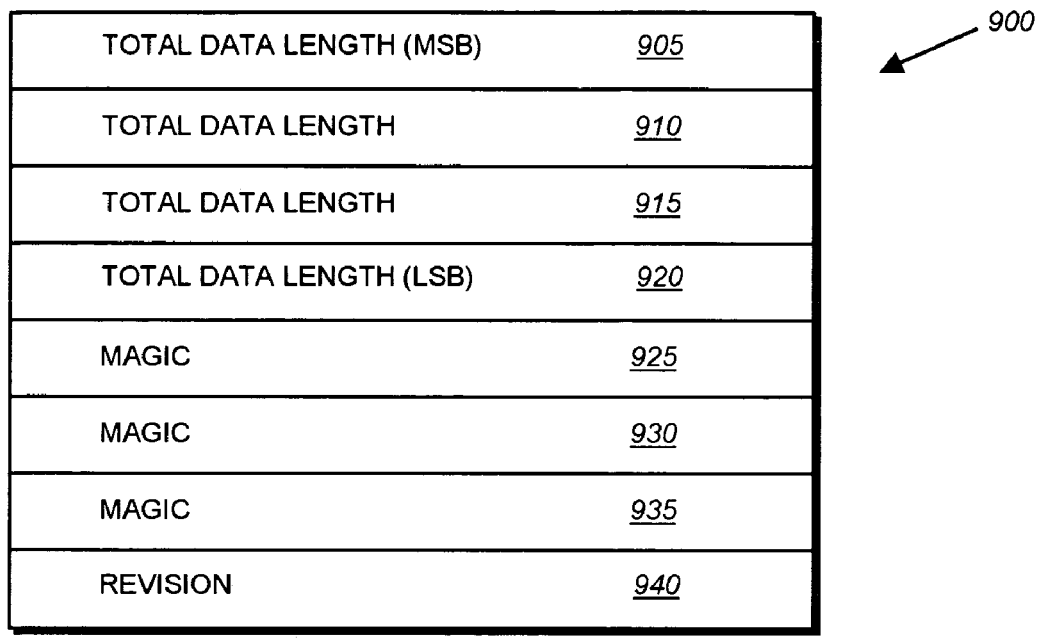
FIG. 9 is a schematic block diagram of an exemplary header information in accordance with an embodiment of the invention.
Figure 11:
FIG. 11 is a schematic block diagram of an exemplary Internet Protocol address page in accordance with an embodiment of the invention.
Figure 12:
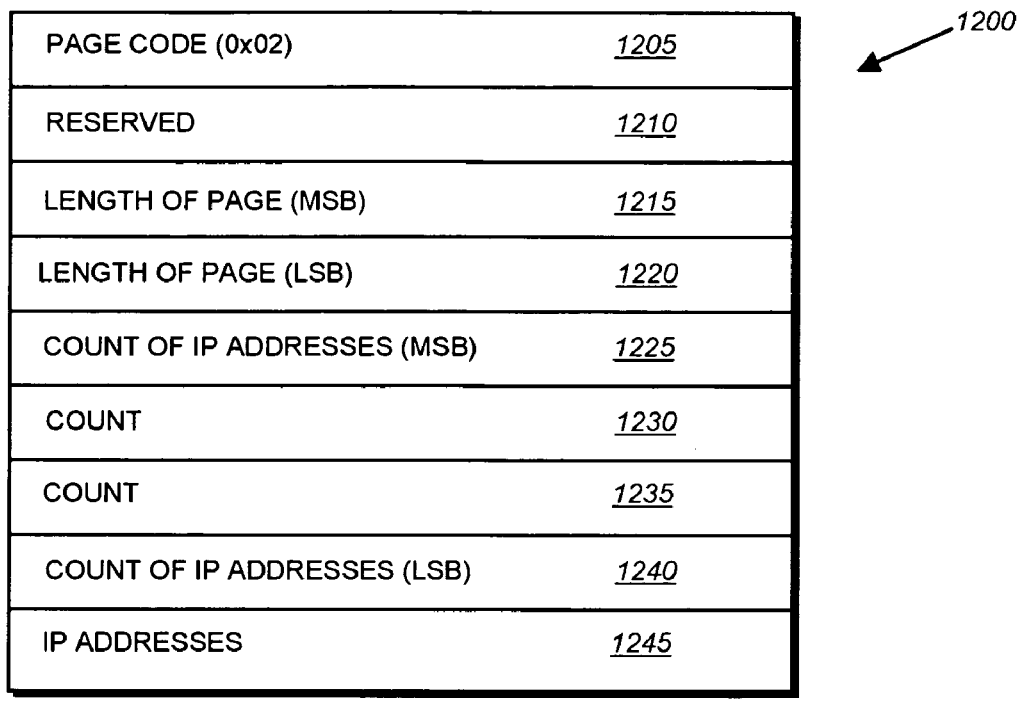
FIG. 12 is a schematic block diagram of an exemplary Internet Protocol address page in accordance with an embodiment of the invention.

A schematic block diagram of the exemplary header information is shown in FIG. 9. The header information begins with a four-byte sequence 905, 910, 915 and 920 identifying the total data length of the return data 800. The header information also includes a set of magic values 925, 930 and 935, which identify the returned information as return information. Finally, the header includes a revision field 940, which identifies the revision of the SCSI code returning the value.

FIGS. 10-16 show exemplary schematic block diagrams of the various data pages that may be returned containing data associated with the particular vdisk. It should be noted that these are exemplary only and that other data pages may be returned in alternate embodiments.

FIG. 10 is a schematic block diagram of an exemplary data structure 1000 for identifying the name of the storage appliance containing the vdisk. This storage appliance name page 1000 includes a field identifying the page code 1005, which in the exemplary embodiment is 0x00. The page 1000 also includes a reserved field 1010 and a two-byte length of page field 1015 and 1020. Finally, the page 1000 includes a null-terminated string identifying the appliance name 1025.

Data structure 1100 (FIG. 11) identifies the number of 32-bit Internet protocol (IP) addresses associated with the vdisk. The data structure 1100 includes a page code field 1105, which in the exemplary embodiment has a value of 0x01. A reserved field 1110 is then followed by a two-byte length of page value stored in fields 1115 and 1120. In the exemplary embodiment, a four-byte count of the IP addresses found is stored in fields 1125, 1130, 1135 and 1140. Finally, a field 1145 identifies the particular IP addresses.

Similarly, data structure 1200 (FIG. 12) identifies the number of 64-bit Internet protocol addresses associated with the vdisk. The data structure 1200 includes a page code field 1205, which in the exemplary embodiment has a value of 0x02. A reserved field 1210 is then followed by two-byte length of page value stored in fields 1215 and 1220. In the exemplary embodiment, a four-byte count of the IP address found is stored in fields 1225, 1230, 1335, and 1240. Finally, a field 1245 identifying the particular IP addresses.

Figure 13:
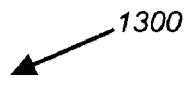
FIG. 13 is a schematic block diagram of an exemplary virtual disk path page in accordance with an embodiment of the invention.

FIG. 13 is a schematic block diagram of a vdisk name page 1300 returning the path name of the vdisk. The page 1300 includes a page code 1305, which in the exemplary embodiment has a value of 0x10. Page 1300 also includes a reserved field 1310 and a two-byte length of page value stored in fields 1315 and 1320. The page 1300 also includes a null-terminated string stored in field 1325 that identifies the path of the virtual disk. In the exemplary embodiment, the path name begins from the name of the storage appliance serving the vdisk.

Figure 14:
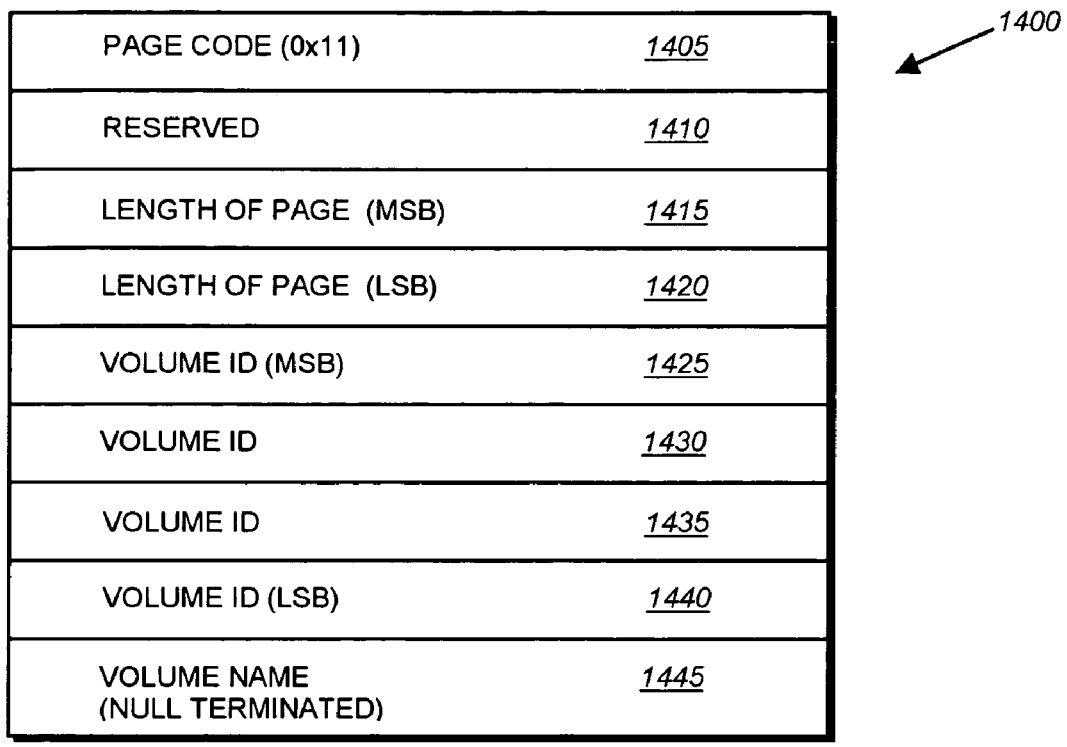
FIG. 14 is a schematic block diagram of an exemplary volume name page in accordance with an embodiment of the invention.
Figure 15:
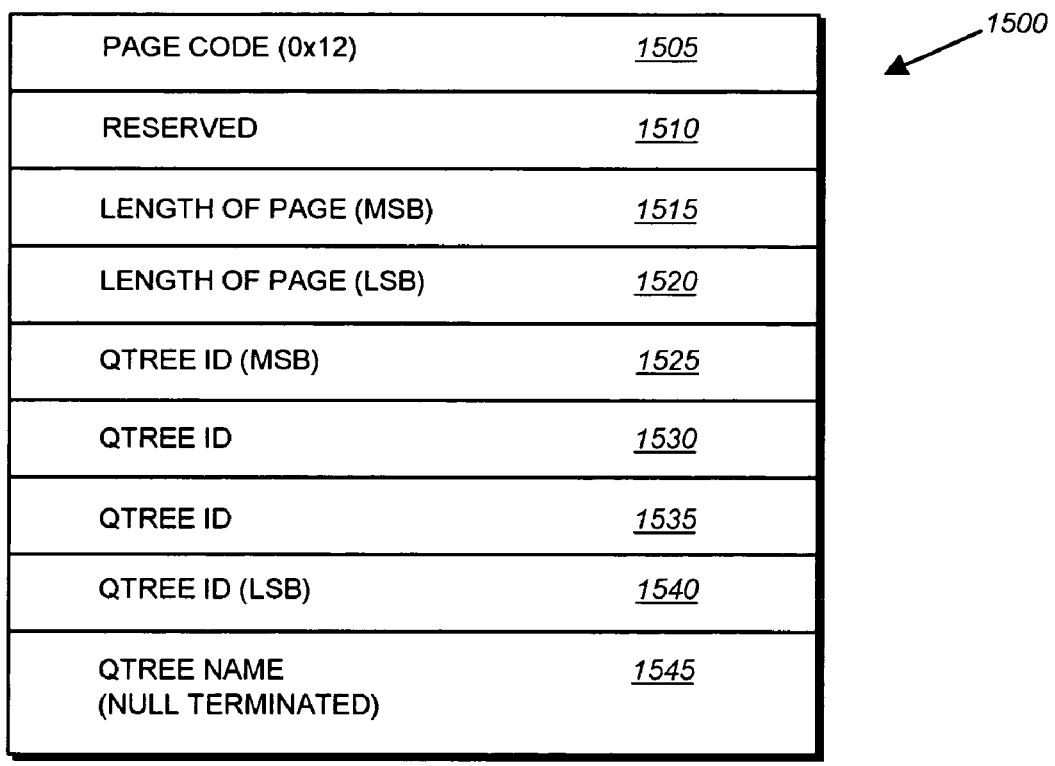
FIG. 15 is a schematic block diagram of an exemplary qtree name page in accordance with an embodiment of the invention.

FIG. 14 identifies a data structure for a page 1400 that identifies the volume on which the virtual disk resides. The page 1400 includes a page code field 1405, which in the exemplary embodiment has a value of 0x11, a reserved field 1410 and a two-byte length of page value stored in fields 1415 and 1420. A four-byte volume identifier stored in fields 1425, 1430, 1435 and 1440 identifying the unique volume ID of the volume on which the vdisk resides. The page 1400 ends with a null-terminated volume name string in field 1445 identifies the name of the volume containing the vdisk.

Similarly, qtree name page 1500 (FIG. 5) identifies the name of the qtree containing the vdisk. The page 1500 includes a page code field 1505, which in the exemplary embodiment has a value of 0x12. Additionally, a four-byte qtree identifier is stored in fields 1525, 1530, 1535 and 1540 and used to identify the unique identification number of the qtree. Finally, the page 1500 includes a null-terminated qtree name in field 1545.

FIG. 16 depicts a data structure identifying a snapshot name page 1600 that identifies the snapshot name containing a virtual disk. The page 1600 begins with a page code, which in the exemplary embodiment has a value of 0x13. A four-byte snapshot identification stored in field 1625, 1630, 1635 and 1640 identifies the unique snapshot ID value associated with the snapshot. A null-terminated snapshot name field 1645 identifies the name of the snapshot containing the vdisk in question.

Thus, in response to receiving an inband vdisk management command data block, the storage appliance serving a given vdisk returns a response that identifies the storage appliance, IP address, virtual disk path, volume name and path, qtree and snapshot information concerning the vdisk. From this returned information, a client may access the storage appliance and, using, for example, RPCs or other application program interfaces (APIs), may cause snapshots to be generated of the vdisk. This enables a client to utilize the additional data integrity and recovery features of the file system containing the vdisk. In alternate embodiments, the client may utilize the returned information to perform various management functions on the multi-protocol storage appliance.

The foregoing description has been directed to specific embodiments of this invention. It will be apparent, however, that other variations and modifications may be made to the described embodiments, with the attainment of some or all of their advantages. For example, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. It is thus the object of the appended claims to cover all such variations and modifications as come within the true spirit and scope of the invention.

What is claimed is:

1. A method for a client to perform a file system operation on a vdisk stored on a storage appliance, comprising:
    sending an inband volume information command to the storage appliance;
    returning a set of volume information associated with the storage appliance, the volume information comprising a network attached vdisk path name associated with a vdisk logical unit number; and
    performing the file system operation directed to the vdisk using the returned volume information.

2. The method of claim 1 wherein the file system operation further comprises:
    generating a snapshot of the vdisk.

3. The method of claim 1 wherein the step of performing a file system operation to the vdisk further comprises:
    sending a remote procedure call to the storage appliance associated with the vdisk.

4. An apparatus for a client to perform a file system operation on a vdisk stored on a storage appliance, comprising:
    i. a network adapter configured to send an inband volume information command to the storage appliance;
    ii. means for returning a set of volume information associated with the storage appliance, the volume information comprising a network attached vdisk path name associated with a vdisk logical unit number; and
    iii. means for performing the file system operation directed to the vdisk using the returned volume information.

5. The apparatus of claim 4 wherein the file system operation further comprises
    means for generating a snapshot of the vdisk.

6. The apparatus of claim 4 wherein the step of performing a file system operation to the vdisk further comprises:

means for sending a remote procedure call to the storage appliance associated with the vdisk.

7. A computer readable medium, executing on a computer, the computer readable medium including program instructions for performing the steps of:

sending an inband volume information command to the storage appliance;

returning a set of volume information associated with the storage appliance, the volume information comprising a network attached vdisk path name associated with a vdisk logical unit number; and performing the file system operation directed to the vdisk using the returned volume information.

8. A storage system, comprising:

an inband volume information command executed by a processor on the storage system, the inband volume information command configured to cause a vdisk to respond with volume information via a block access protocol, wherein the volume information identifies the vdisk within the storage system.

* * * * *